United States Patent
Ikeya (10) Patent No.: US 8,940,448 B2
(45) Date of Patent: Jan. 27, 2015

(54) FUEL CELL SYSTEM

(75) Inventor: Kengo Ikeya, Shizuoka-ken (JP)

(73) Assignee: Suzuki Motor Corporation (JP)

( * ) Notice: Subject to any disclaimer, the term of this patent is extended or adjusted under 35 U.S.C. 154(b) by 191 days.

(21) Appl. No.: 13/808,650

(22) PCT Filed: Jul. 13, 2011

(86) PCT No.: PCT/JP2011/065925
§ 371 (c)(1),
(2), (4) Date: Jan. 7, 2013

(87) PCT Pub. No.: WO2012/029414
PCT Pub. Date: Mar. 8, 2012

(65) Prior Publication Data
US 2013/0149625 A1 Jun. 13, 2013

(30) Foreign Application Priority Data

Aug. 31, 2010 (JP) ................... 2010-194192

(51) Int. Cl.
*H01M 8/04* (2006.01)
*B60L 3/00* (2006.01)
(Continued)

(52) U.S. Cl.
CPC ........... *H01M 8/0435* (2013.01); *B60L 3/0053* (2013.01); *B60L 11/1892* (2013.01); *B60L 11/1894* (2013.01); *B60L 11/1896* (2013.01); *B60L 11/1898* (2013.01); *H01M 8/04014* (2013.01); *H01M 8/04328* (2013.01); *H01M 8/04753* (2013.01); *H01M 8/04761* (2013.01); *H01M 8/04074* (2013.01); *H01M 8/04089* (2013.01); *H01M 8/04208* (2013.01);
(Continued)

(58) Field of Classification Search
CPC .................... B60K 15/07; B60K 2015/03315; B60K 2015/0634; B60K 6/32; B60L 11/1892; B60L 11/1894; B60L 11/1896; B60L 11/1898; B60L 1/003; B60L 2240/36; B60L 3/0053; F16C 11/005; H01M 2250/20; H01M 8/04014; H01M 8/04074; H01M 8/04089; H01M 8/04208
USPC .................................. 429/407, 408, 433, 434
See application file for complete search history.

(56) References Cited

FOREIGN PATENT DOCUMENTS

DE 20 2009 011 748 U1 12/2009
EP 1 818 204 B1 7/2012
(Continued)

OTHER PUBLICATIONS

Office Action corresponding to German Application No. 11 2011 102 865.2 issued Jul. 14, 2014.
(Continued)

*Primary Examiner* — Patrick Ryan
*Assistant Examiner* — Ben Lewis
(74) *Attorney, Agent, or Firm* — Myers Bigel Sibley & Sajovec, P.A.

(57) ABSTRACT

This invention relates to a fuel cell system comprising: a fuel cell stack; a hydrogen-gas supply device configured to supply hydrogen gas filled in a hydrogen tank into the fuel cell stack along with pressure reduction of the hydrogen gas; an air supply duct configured to supply air into the fuel cell stack; and an air exhaust duct configured to exhaust surplus air from the fuel cell stack. The hydrogen-gas supply device is disposed inside a heat exchange chamber capable of communicating with the air supply duct and the air exhaust duct.

9 Claims, 6 Drawing Sheets (51) Int. Cl.
  *B60L 11/18* (2006.01)
  *B60L 1/00* (2006.01)
  *F17C 11/00* (2006.01)
  *B60K 6/32* (2007.10)
  *B60K 15/07* (2006.01)
  *B60K 15/03* (2006.01)
  *B60K 15/063* (2006.01)

(52) U.S. Cl.
  CPC ...... *H01M8/04335* (2013.01); *H01M 8/04373* (2013.01); *H01M 8/04447* (2013.01); *H01M 8/04358* (2013.01); *H01M 8/04708* (2013.01); *B60L 1/003* (2013.01); *F17C 11/005* (2013.01); *B60K 6/32* (2013.01); *B60K 15/07* (2013.01); *B60K 2015/03315* (2013.01); *B60K 2015/0634* (2013.01); *Y02T 90/16* (2013.01); *Y02T 90/34* (2013.01); *H01M 2250/20* (2013.01); *Y02E 60/50* (2013.01); *Y02T 90/32* (2013.01); *B60L 2240/36* (2013.01); *Y02E 60/321* (2013.01)
  USPC ............ 429/433; 429/407; 429/408; 429/434

(56) References Cited

FOREIGN PATENT DOCUMENTS

| | | | | |
|---|---|---|---|---|
| JP | 57-138780 | | 8/1982 | |
| JP | 62-017961 | | 1/1987 | |
| JP | 62-208563 | | 9/1987 | |
| JP | 1-77267 U | | 5/1989 | |
| JP | 2004-082793 | | 3/2004 | |
| JP | 2004-360709 | | 12/2004 | |
| JP | 2005-044520 | * | 2/2005 | .............. H01M 8/04 |
| JP | 2005-071830 | | 3/2005 | |
| JP | 2006-019119 | | 1/2006 | |
| JP | 2006-344471 | | 12/2006 | |
| JP | 2007-161024 | | 6/2007 | |

OTHER PUBLICATIONS

International Search Report corresponding to International Application No. PCT/JP2011/065925 mailed Oct. 18, 2011.

* cited by examiner

FUEL CELL SYSTEM

RELATED APPLICATIONS

This application is a 35 U.S.C. §371 national stage application of PCT Application No. PCT/JP2011/065925, filed on Jul. 13, 2011, which claims priority from Japanese Application No. 2010-194192 filed on Aug. 31, 2010, the contents of which are incorporated herein by reference in their entireties. The above-referenced PCT International Application was published as International Publication No. WO 2012/029414 A1 on Mar. 8, 2012.

TECHNICAL FIELD

This invention relates to a fuel cell system, and particularly to a fuel cell system capable of effectively performing heat exchange between a hydrogen-gas supply device and a fuel cell stack to maintain the atmospheres in the device and the stack within appropriate temperature ranges and thereby to prevent excessive heating and excessive cooling thereof.

BACKGROUND ART

Figure 6:
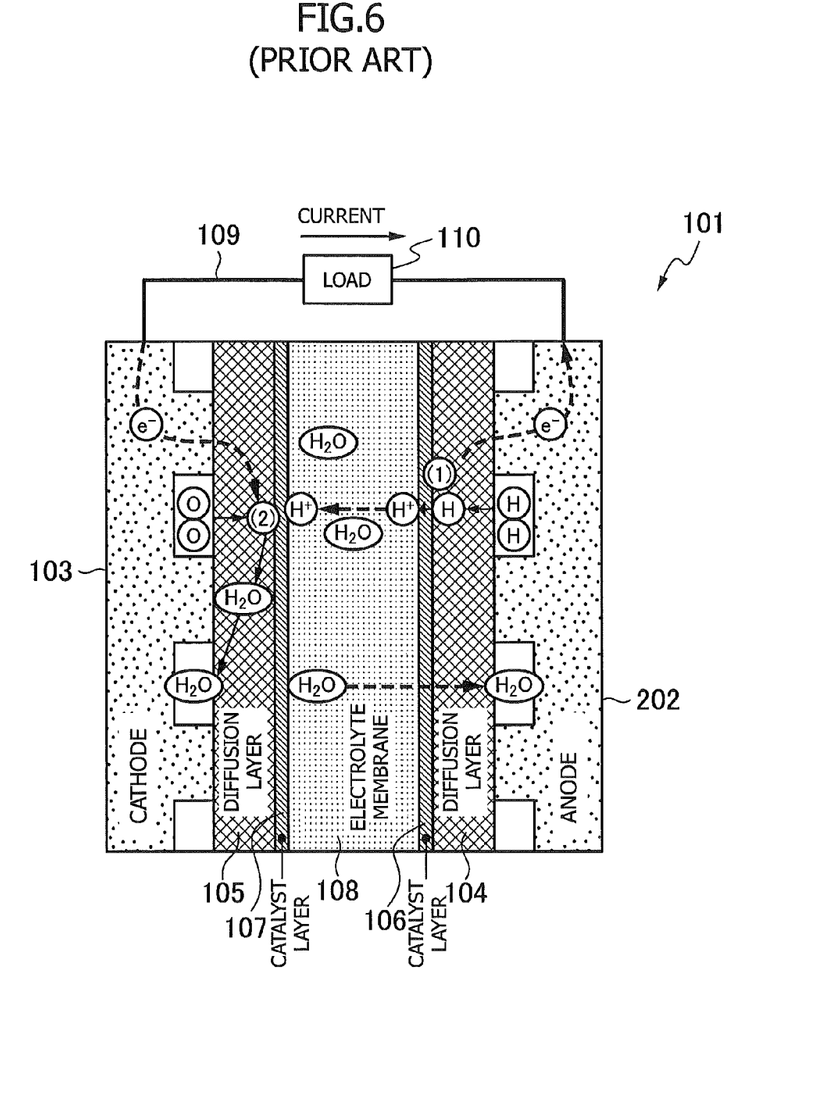
FIG. 6 is a cross-sectional view of a conventional fuel cell.

Fuel cell systems mounted on fuel cell vehicles generate power by means of an electrochemical reaction, which is accompanied by the production of water. In general, the fuel cells of such a fuel cell system are configured as a fuel cell stack obtained by stacking a number of the smallest constitutional units called cells. In a case of a general polymer electrolyte fuel cell, as shown in FIG. 6, a cell 101 includes an anode 102 and a cathode 103 configured to supply hydrogen and air (oxygen), respectively, between which there are disposed diffusion layers 104 and 105, catalyst layers 106 and 107 for activating the reaction, and, in the center, an electrolyte membrane 108 configured to selectively transmit hydrogen ions.

Hydrogen molecules supplied to the anode 102 turn into active hydrogen atoms in the catalyst layer 106 present on the surface of the electrolyte membrane 108 on the anode 102 side, and further turn into hydrogen ions, releasing electrons. This reaction, which is illustrated as (1) in FIG. 6, is expressed in Formula 1 below.

$$H_2 \rightarrow 2H^+ + 2e^- \quad \text{(Formula 1)}$$

The hydrogen ions generated by Formula 1 transfer through the electrolyte membrane 108 from the anode 102 side to the cathode 103 side together with the moisture contained in the electrolyte membrane 108, while the electrons transfer to the cathode 103 through an external circuit 109. By this electron transfer, current flows in a load (e.g. a vehicle's traction motor) 110 arranged in the external circuit 109.

On the other hand, the oxygen molecules in the air supplied to the cathode 103 turn into oxygen ions in the catalyst layer 107 by receiving the electrons supplied from the external circuit 109, and then turn into water by bonding to the hydrogen ions transferring through the electrolyte membrane 108. This reaction, which is illustrated as (2) in FIG. 6, is expressed in Formula 2 below $$\tfrac{1}{2}O_2 + 2H^{3O} + 2e^- \rightarrow H_2O \quad \text{(Formula 2)}$$

Part of the water thus produced transfers from the cathode 103 to the anode 102 due to concentration diffusion. In the chemical reactions described above, various kinds of loss occur inside the cell 101 such as resistance overvoltages attributable to the electrical resistances of the electrolyte membrane 108 and the electrodes, an activation overvoltage due to the electrochemical reaction between hydrogen and oxygen, and diffusion overvoltages due to the transfer of hydrogen and oxygen through the diffusion layers 104 and 105. The waste heat generated accordingly needs to be dissipated.

There are a water-cooled type and an air-cooled type for fuel cell systems including the above cell 101.

Figure 7:
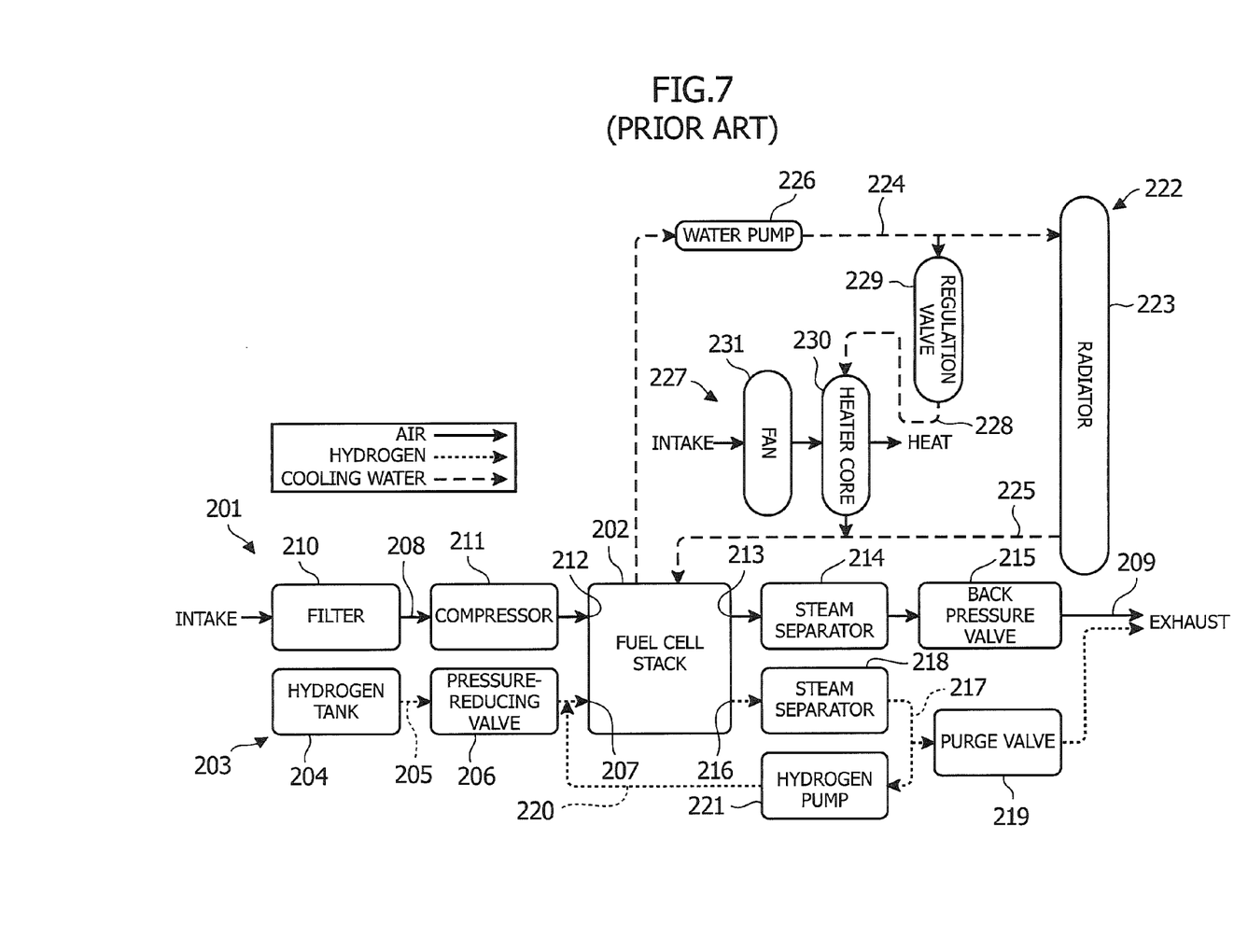
FIG. 7 is a block diagram of a conventional water-cooled fuel cell system.

First, FIG. 7 shows the configuration of a general water-cooled fuel cell system of a conventional fuel cell vehicle. A fuel cell system 201 shown in FIG. 7 includes a fuel cell stack 202 obtained by stacking a number of cells, or the smallest constitutional units mentioned above, and also includes a hydrogen-gas supply device 203 configured to supply hydrogen gas to the fuel cell stack 202.

The hydrogen-gas supply device 203 introduces compressed hydrogen gas stored in a high-pressure hydrogen tank 204 into an anode intake part 207 of the fuel cell stack 202 by way of a hydrogen supply pipe 205 via a pressure-reducing valve 206. In this process, the temperature of the hydrogen gas drops due to adiabatic expansion of the gas, which in turn cools down hydrogen-related components including the hydrogen tank 204 and those between the hydrogen tank 204 and the fuel cell stack 202 such as the hydrogen supply pipe 205 as well as a shutoff valve and the pressure-reducing valve 206 given in an intermediate portion thereof.

On the other hand, the fuel cell system 201 includes an air supply duct 208 for supplying air to the fuel cell stack 202, and an air exhaust duct 209 for exhausting surplus air from the fuel cell stack 202. In the air supply duct 208, ambient air drawn through a filter 210 is compressed by a high-pressure compressor 211 and is then introduced into a cathode intake part 212 of the fuel cell stack 202. As a result, power generation is performed in the fuel cell stack 202.

The surplus air left unused in the power generation in the fuel cell stack 202 is exhausted to the air exhaust duct 209 through a cathode exhaust part 213 of the fuel cell stack 202 as cathode exhaust. The cathode exhaust exhausted to the air exhaust duct 209 is separated from part of the water in the exhaust by a steam separator 214, and then released to the atmosphere via a back pressure valve 215 aiming to control the pressure of the cathode system.

Meanwhile, the surplus hydrogen gas left unused in the power generation in the fuel cell stack 202 is exhausted to a hydrogen purge pipe 217 through an anode exhaust part 216 as anode exhaust. The hydrogen purge pipe 217 is connected to an intermediate portion of the air exhaust duct 209. Like the cathode exhaust, the anode exhaust exhausted to the hydrogen purge pipe 217 flows through a steam separator 218 as in the case of the cathode exhaust, and is then mixed to the cathode exhaust in the air exhaust duct 209 via a purge valve 219.

The amount of flow of the purged hydrogen exhaust, or the anode exhaust from the anode exhaust part 216, is smaller than that of the cathode exhaust to a large extent. Thus, the purged hydrogen from the anode exhaust part 216 can be released to the atmosphere at a concentration of 4%, which is the lower explosive limit, or lower with the help of the cathode exhaust. Note that in some fuel cell systems, the hydrogen purge pipe 217 is connected to the anode intake part 207 by a hydrogen return pipe 220, and a hydrogen pump 221 provided to the hydrogen return pipe 220 is used to re-circulate the anode exhaust to the anode intake part 207, for the purpose of improving the use efficiency of the hydrogen.

Now, a cooling system 222 of the water-cooled fuel cell system 201 will be described. The cooling system 222 includes a radiator 223 configured to cool down cooling water of the fuel cell stack 202. In the cooling system 222, a cooling loop is formed by connecting the fuel cell stack 202 to the radiator 223 by a cooling-water inlet passage 224 and connecting the radiator 223 to the fuel cell stack 202 by a cooling-water outlet passage 225.

The cooling system 222 includes a water pump 226 in the cooling-water inlet passage 224 connected to either an upstream or downstream side (downstream side in FIG. 7) of the fuel cell stack 202 to thereby pump the cooling water to the radiator 223. The cooling water having cooled down the fuel cell stack 202 exchanges its heat with the atmosphere in the radiator 223 and is then returned again to the fuel cell stack 202 through the cooling-water outlet passage 225.

This cooling system 222 is provided with a heating device 227. The heating device 227 includes a heating passage 228 connecting the cooling-water inlet passage 224 and the cooling-water outlet passage 225, and also includes a heater core 230 for warming up the cabin in the heating passage 228 with a regulation valve 229 therebetween in parallel with the radiator 223. When heating is needed, the heating device 227 supplies the cooling water, which is hot, to the heater core 228 by opening the regulation valve 229 and drives a fan 231 for blowing air, to thereby warm up the cabin.

As described above, the water-cooled fuel cell system 201 includes many accessories such as the compressor 211 for compressing the air introduced into the air supply duct 208, for the purpose of improving the output density of the fuel cell stack 202. Such a water-cooled fuel cell system 201 then results in a more complicated, larger, heavier, and more expensive system. In contrast, there is an air-cooled fuel cell system achieving simplification of the system by eliminating accessories such as the compressor and employing air cooling for the cooling of the fuel cells.

Figure 8:
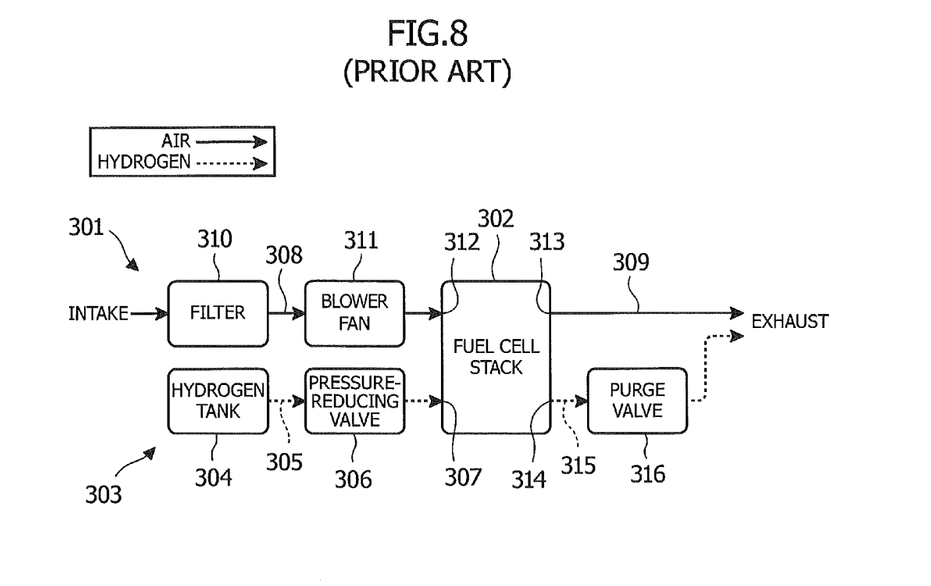
FIG. 8 is a block diagram of a conventional air-cooled fuel cell system.
Figure 9:
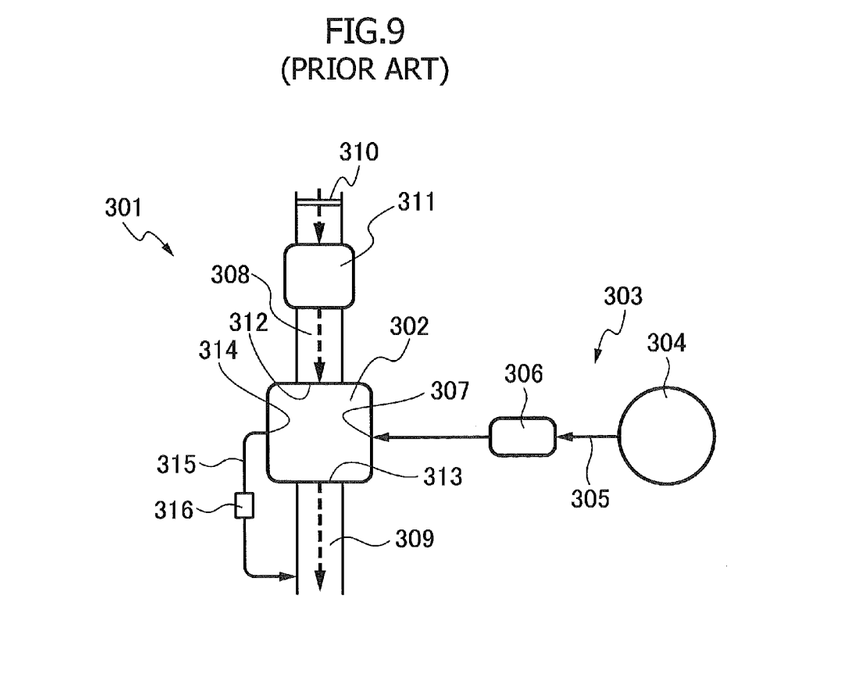
FIG. 9 is a block diagram showing the flow of hydrogen and air in the conventional air-cooled fuel cell system.

FIGS. 8 and 9 show an air-cooled fuel cell system 301. As shown in FIG. 8, like the above-described water-cooled fuel cell system 201, the air-cooled fuel cell system 301 includes a fuel cell stack 302 obtained by stacking a number of cells, or the smallest constitutional units, and also includes a hydrogen-gas supply device 303 configured to supply hydrogen gas to the fuel cell stack 302. The hydrogen-gas supply device 303 introduces compressed hydrogen gas stored in a high-pressure hydrogen tank 304 into an anode intake part 307 of the fuel cell stack 302 by way of a hydrogen supply pipe 305 via a pressure-reducing valve 306. In this process, the temperature drop of the hydrogen gas due to its adiabatic expansion cools down hydrogen-related components including the hydrogen tank 304, the hydrogen supply pipe 305, the pressure-reducing valve 306, and the like.

Here, in general, the air-cooled fuel cell system 301 does not include the high-pressure compressor on the cathode intake side, unlike the water-cooled fuel cell system. As shown in FIG. 9, the fuel cell system 301 includes an air supply duct 308 for supplying air to the fuel cell stack 302, and an air exhaust duct 309 for exhausting surplus air from the fuel cell stack 302. The air supply duct 308 supplies ambient air drawn through a filter 310 into a cathode intake part 312 of the fuel cell stack 302 by means of a low-pressure blower fan 311.

Moreover, the air supplied to the cathode intake part 312 is not only used as the reactant gas with the hydrogen for the power generation reaction in the many cells stacked in the fuel cell stack 302, but also functions as a cooling medium to remove the waste heat in the fuel cell stack 302 to cool down the fuel cell stack 302.

As shown in FIG. 9, the surplus air after the reaction with the hydrogen and the air having cooled down the fuel cell stack 302 are exhausted to the air exhaust duct 309 through a cathode exhaust part 313 of the fuel cell stack 302 as cathode exhaust, and then released to the atmosphere. The surplus hydrogen gas left unused in the power generation in the fuel cell stack 302 is exhausted to a hydrogen purge pipe 315 through an anode exhaust part 314 as anode exhaust. The hydrogen purge pipe 315 is connected to an intermediate portion of the air exhaust duct 309. The anode exhaust exhausted to the hydrogen purge pipe 315 is mixed to the cathode exhaust in the air exhaust duct 309 via a purge valve 316. When the hydrogen-gas purge on the anode side is performed, the exhausted hydrogen gas is diluted to its lower explosive limit or lower with the help of the cathode exhaust and is then released to the atmosphere.

The air-cooled fuel cell system 301 which uses the low-pressure blower fan 311 to supply air as both the reactant gas and the cooling medium as described above can achieve a reduced power consumption as well as a smaller, lighter, and simpler system. However, since the amount of air flow is limited, the cooling performance is lower than that of the water-cooled fuel cell system described above. For this reason, the operable temperature range of the fuel cell stack 302 is narrow in some cases, which possibly leads to overheating of the fuel cell stack 302 during a high-temperature period such as in the summer.

As described above, in the water-cooled fuel cell system and the air-cooled fuel cell system, when hydrogen, which is the fuel, is supplied to the fuel cell stack from the hydrogen tank storing the hydrogen in the form of high-pressure gas, the hydrogen gas, which is the fuel, is cooled down by its adiabatic expansion. The hydrogen gas thus lowered to a low temperature in turn excessively cools down the various hydrogen-related components including the hydrogen tank itself and also those provided between the hydrogen tank and the fuel cell stack such as the pressure-reducing valve and the regulator for the pressure regulation. The excessive cooling has been pointed out as possibly affecting the durability and reliability of these hydrogen-related components.

To avoid such inconvenience, Japanese Utility Model Registration Application Publication No. Hei 1-77267 and Japanese Patent Application Publication No 2007-161024, for example, disclose a technique in which a hydrogen-gas pipe and a cooling-water pipe for cooling down fuel cells are disposed adjacent to each other, or a hydrogen-gas pipe and a pipe for exhaust gas from a fuel cell system are disposed adjacent to each other. Moreover, Japanese Patent Application Publication No. 2005-44520, for example, discloses a technique in which a hydrogen-related component is arranged at such a position as to be capable of receiving the heat released from a radiator in a cooling system of a fuel cell stack.

CITATION LIST

Patent Literatures

[PTL 1] Japanese Utility Model Registration Application Publication No. Hei 1-77267
[PTL 2] Japanese Patent Application Publication No 2007-161024
[PTL 3] Japanese Patent Application Publication No 2005-44520

SUMMARY OF INVENTION

Technical Problems

However, in the technique disclosed in Patent Literatures 1 and 2 mentioned above, the hydrogen-gas pipe at a low temperature and the cooling-water or exhaust-gas pipe at a high temperature are only disposed adjacent to each other. Thus, the efficiency of the heat exchange therebetween cannot be said to be good.

Moreover, in the technique disclosed in Patent Literature 3 mentioned above, the radiator is generally mounted on a front part of the vehicle, whereas the hydrogen tanks are often mounted under the floor of the vehicle between a center portion and a rear portion thereof. Thus, employing this technique has a problem of imposing a great limitation on the arrangement.

An object of this invention is to prevent hydrogen-related components from becoming cold due to the adiabatic expansion of hydrogen gas, and also to improve the cooling performance of a fuel cell stack.

Solution to Problems

The invention is a fuel cell system comprising: a fuel cell stack; a hydrogen-gas supply device configured to supply hydrogen gas filled in a hydrogen tank into the fuel cell stack along with pressure reduction of the hydrogen gas; an air supply duct configured to supply air into the fuel cell stack; and an air exhaust duct configured to exhaust surplus air from the fuel cell stack, the fuel cell system, in which the hydrogen-gas supply device is disposed inside a heat exchange chamber capable of communicating with the air supply duct and the air exhaust duct, the air exhausted from the fuel cell stack is introduced into the heat exchange chamber when a temperature of the hydrogen-gas supply device reaches or falls below a predetermined temperature, and air introduced into the heat exchange chamber and cooled down by the hydrogen-gas supply device is supplied into the fuel cell stack when a temperature of the air exhausted from the fuel cell stack reaches or exceeds a predetermined temperature.

Advantageous Effects of Invention

By the structure in which the hydrogen-gas supply device is disposed inside the heat exchange chamber capable of communicating with the air supply duct and the air exhaust duct, the fuel cell system of the invention heats the hydrogen-gas supply device with the hot air exhausted from the fuel cell stack when the temperature of the hydrogen-gas supply device reaches or falls below a predetermined temperature (lower limit temperature). Accordingly, it is possible to prevent the hydrogen-gas supply device from becoming cold.

Moreover, the fuel cell system of this invention can supply the fuel cell stack with the air introduced into the heat exchange chamber and cooled down by the hydrogen-gas supply device when the air exhausted from the fuel cell stack reaches or exceeds a predetermined temperature (upper limit temperature). Accordingly, it is possible to improve the cooling performance of the fuel cell stack.

DESCRIPTION OF EMBODIMENTS

Hereinbelow, an embodiment of the present invention will be described based on the drawings.

Figure 1:
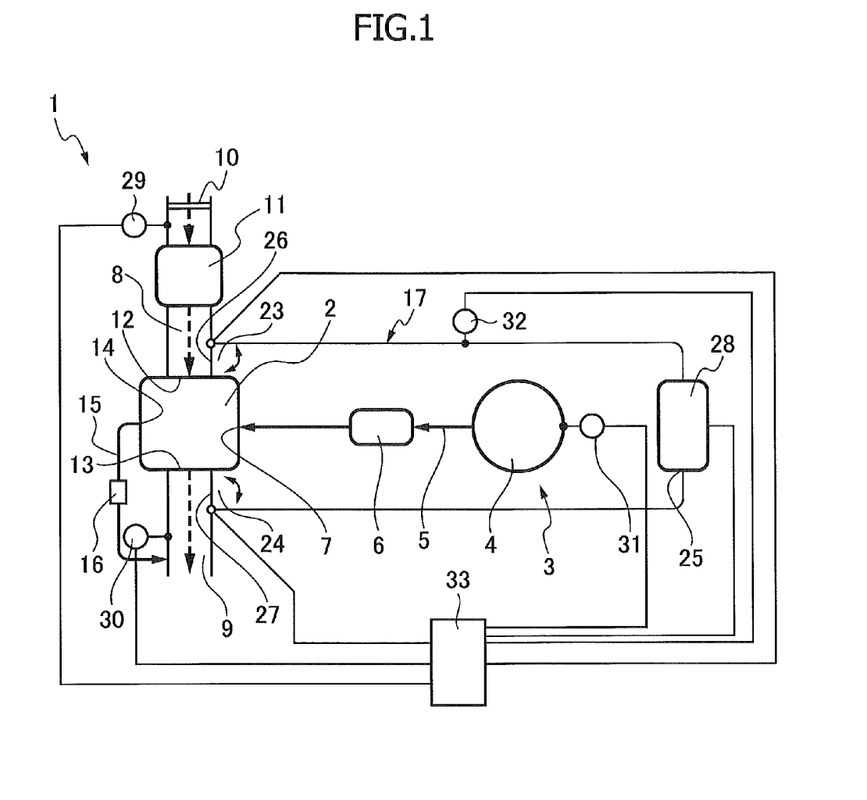
FIG. 1 is a block diagram of a fuel cell system according to an embodiment of the present invention.

FIGS. 1 to 5 show a fuel cell system 1 according to the embodiment of the present invention. In FIG. 1, the fuel cell system 1 is a fuel cell system mounted on a fuel cell vehicle. As described earlier (FIGS. 6 to 9), the fuel cell system 1 includes a fuel cell stack 2 obtained by stacking a number of the smallest constitutional units called cells, and generates power by means of an electrochemical reaction, which is accompanied by the production of water. The fuel cell system 1 includes a hydrogen-gas supply device 3 configured to supply hydrogen gas to the fuel cell stack 2. The hydrogen-gas supply device 3 introduces a compressed hydrogen gas stored in a high-pressure hydrogen tank 4 into an anode intake part 7 of the fuel cell stack 2 by way of a hydrogen supply pipe 5 via a pressure-reducing valve 6.

Moreover, unlike the water-cooled fuel cell system, the fuel cell system 1 generally includes no high-pressure compressor on the cathode intake side. The fuel cell system 1 includes an air supply duct 8 for supplying air into the fuel cell stack 2, and an air exhaust duct 9 for exhausting surplus air from the fuel cell stack 2. The air supply duct 8 supplies ambient air drawn through a filter 10 into a cathode intake part 12 of the fuel cell stack 2 by means of a low-pressure blower fan 11. The air supplied to the cathode intake part 12 is not only used as the reactant gas with the hydrogen for the power generation reaction in the many cells stacked in the fuel cell stack 2, but also functions as a cooling medium to remove the waste heat in the fuel cell stack 2 to cool down the fuel cell stack 2.

Thus, the fuel cell stack 2 is an air-cooled fuel cell stack using air as both the reactant gas and the cooling medium. Accordingly, the fuel cell system 1 is an air-cooled fuel cell system.

The surplus air after the reaction with the hydrogen, and the air having cooled down the fuel cell stack 2 are exhausted to the air exhaust duct 9 through a cathode exhaust part 13 of the fuel cell stack 2 as cathode exhaust, and is then released to the atmosphere. The surplus hydrogen gas left unused in the power generation in the fuel cell stack 2 is exhausted to a hydrogen purge pipe 15 through an anode exhaust part 14 as anode exhaust. The hydrogen purge pipe 15 is connected to an intermediate portion of the air exhaust duct 9. The anode exhaust exhausted to the hydrogen purge pipe 15 is mixed to the cathode exhaust in the air exhaust duct 9 via a purge valve 16. When the hydrogen-gas purge on the anode side is performed, the exhausted hydrogen gas is diluted to its lower explosive limit or lower with the help of the cathode exhaust and then released to the atmosphere.

Figure 2:
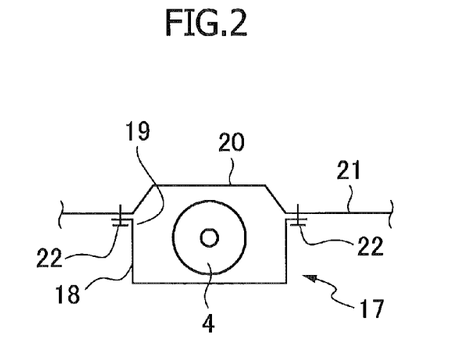
FIG. 2 is a cross-sectional view of a heat exchange chamber according to the embodiment of the present invention.

This fuel cell system 1 has the hydrogen-gas supply device 3 disposed inside a heat exchange chamber 17 capable of communicating with the air supply duct 8 and the air exhaust duct 9. The heat exchange chamber 17 does not have to have a tightly sealed chamber structure. As shown in FIG. 2, the heat exchange chamber 17 of this embodiment includes a lower chamber part 18 in such a cross-sectional shape as to be open on the upper side, and an upper chamber part 20 covering this opening 19 of the lower chamber part 18. The upper chamber part 20 is formed in an upwardly projecting shape in a floor 21 of the fuel cell vehicle. With the lower chamber part 18 attached to the upper chamber part 20 with fixtures 22, the heat exchange chamber 17 can close the opening 19 on the upper side of the lower chamber part 18 with the upper chamber 20.

The heat exchange chamber 17 includes: a first communication part 23 communicating with the air supply duct 8; a second communication part 24 communicating with the air exhaust duct 9; and a third communication part 25 communicating with the inside and outside of the heat exchange chamber 17 at an upstream portion (the hydrogen tank 4 side) thereof in the direction of the flow of the hydrogen gas inside the hydrogen supply pipe 5. In the first communication part 23 and the second communication part 24, a first switch valve 26 and a second switch valve 27 are disposed which are configured to open and close these communication parts 23 and 24, respectively. In the third communication part 25, an air blowing fan 28 is disposed which is capable of switching its blowing direction between one toward the inside of the heat exchange chamber 17 and one toward the outside thereof.

The first communication part 23 is in communication with the air supply duct 8 at a portion which is downstream of the blower fan 11 but immediately upstream of the cathode intake part 12 of the fuel cell stack 2 in the direction of the flow of the air in the air supply duct 8. The second communication part 24 is in communication with the air exhaust duct 9 at a portion immediately downstream of the cathode exhaust part 13 of the fuel cell stack 2 in the direction of the flow of the air in the air exhaust duct 9. The hydrogen purge pipe 15 for exhausting the surplus hydrogen gas which is connected to the anode exhaust part 14 of the fuel cell stack 2 has its downstream end portion connected to the air exhaust duct 9 at a portion downstream of the second communication part 24 in the direction of the flow of the air in the air exhaust duct 9. The air blowing fan 28 disposed in the third communication part 25 has an explosion-proof structure and is capable of blowing air into and out of the heat exchange chamber 17 by rotating a motor in its forward and backward directions, respectively.

As described above, in the fuel cell system 1, the heat exchange chamber 17 is formed in such a form as to be connected to the air supply duct 8 for supplying air into the fuel cell stack 2 and to the air exhaust duct 9 for exhausting air from the fuel cell stack 2. Moreover, hydrogen-related components including the hydrogen tank 4, the hydrogen supply pipe 5, and the pressure-reducing valve 6 of the hydrogen-gas supply device 3 are disposed inside the heat exchange chamber 17. In this way, this fuel cell system 1 is configured to be capable of heat exchange between the air supply duct 8 and air exhaust duct 9 and each of the hydrogen-related components between the hydrogen tank 4 and the fuel cell stack 2 such as the hydrogen supply pipe 5 and the pressure-reducing valve 6.

This fuel cell system 1 includes a supplied-air temperature sensor 29 configured to detect the temperature of the air supplied between the filter 10 and the blower fan 11 in the air supply duct 8, and also includes an exhausted-air temperature sensor 30 configured to detect the temperature of the air exhausted to the air exhaust duct 9 at a portion upstream of the spot where the hydrogen purge pipe 15 is connected. The fuel cell system 1 also includes, in the hydrogen tank 4 of the hydrogen-gas supply device 3, a hydrogen-tank temperature sensor 31 configured to detect the tank temperature, and further includes, in the heat exchange chamber 17, a hydrogen-gas concentration sensor 32 configured to detect the hydrogen-gas concentration therein. The fuel cell system 1 includes a control means 33 for controlling the first switch valve 26, the second switch valve 27, and the air blowing fan 28 on the basis of the detection signals of the supplied-air temperature sensor 29, the exhausted-air temperature sensor 30, the hydrogen-tank temperature sensor 31, and the hydrogen-gas concentration sensor 32.

The fuel cell system 1 operates the first switch valve 26, the second switch valve 27, and the air blowing fan 28 by means of the control means 33 on the basis of the temperatures detected by the supplied-air temperature sensor 29, the exhausted-air temperature sensor 30, and the hydrogen-tank temperature sensor 31.

This fuel cell system 1 controls the first switch valve 26, the second switch valve 27, and the air blowing fan 28 by means of the control means 33 such that the air exhausted from the fuel cell stack 2 is introduced into the heat exchange chamber 17 to heat the hydrogen-gas supply device 3 when the temperature of the hydrogen tank 4 of the hydrogen-gas supply device 3 detected by the hydrogen-tank temperature sensor 31 reaches or falls below a predetermined temperature, whereas the air introduced into the heat exchange chamber 17 and cooled down by the hydrogen-gas supply device 3 is supplied to the fuel cell stack 2 when the temperature of the air exhausted from the fuel cell stack 2 reaches or exceeds a predetermined temperature.

Moreover, the fuel cell system 1 operates the first switch valve 26, the second switch valve 27, and the air blowing fan 28 by means of the control means 33 such that the ambient air is introduced into the heat exchange chamber 17 and flowed into the air exhaust duct 9 when the hydrogen-gas concentration detected by the hydrogen-gas concentration sensor 32 reaches or exceeds a predetermined concentration.

Further, in a case of filling hydrogen gas into the hydrogen tank 4, the fuel cell system 1 opens at least one of the first switch valve 26 and the second switch valve 27 and introduces the ambient air into the heat exchange chamber 17 through the air blowing fan 28 by means of the control means 33 when the temperature of the hydrogen tank 4 exceeds a predetermined value.

Figure 3:
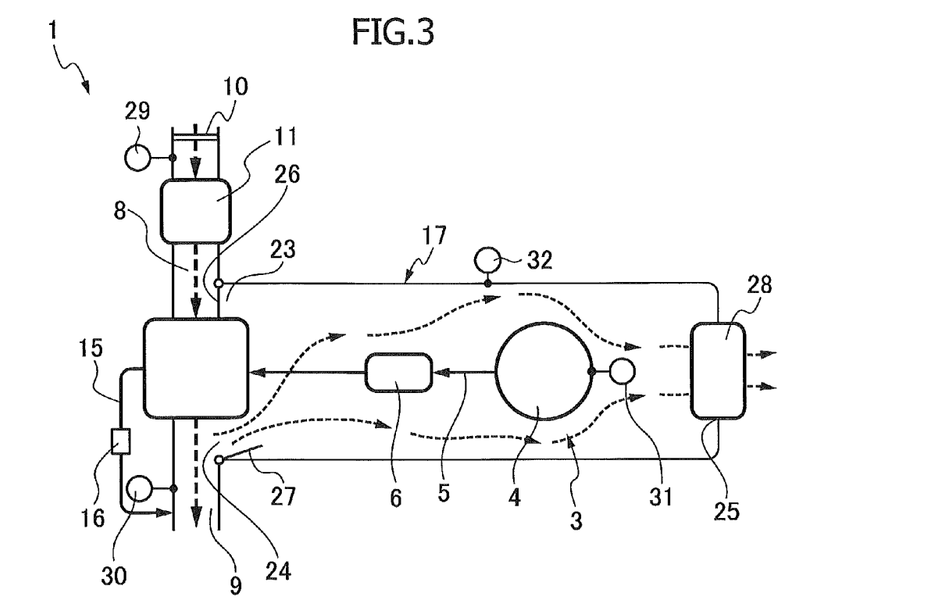
FIG. 3 is a block diagram showing an operation of the fuel cell system according to the embodiment of the present invention during a low-temperature period.

Next, operations of the fuel cell system 1 will be described. During a low-temperature period, as shown in FIG. 3, the fuel cell system 1 closes the first communication part 23 with the first switch valve 26 and, at the same time, opens the second communication part 24 with the second switch valve 27, and further rotates the air blowing fan 28 in the third communication part 25 in an air exhausting direction, which is from the inside to the outside of the heat exchange chamber 17, to thereby guide the hot exhaust air from the fuel cell stack 2 into the heat exchange chamber 17 so that excessive cooling of the hydrogen-related components can be prevented.

The excessive cooling of the hydrogen-related components such as the hydrogen tank 4 occurs under a condition I which the amount of hydrogen consumed in the fuel cell stack 2 is large, causing a rapid drop in the pressure of the hydrogen tank 4. Under such a condition, the amount of waste heat from the fuel cell stack 2 is large as well. Thus, by guiding the exhaust air from the fuel cell stack 2 into the heat exchange chamber 17 housing the hydrogen-related components, it is possible to prevent the excessive cooling of the hydrogen-related components.

Figure 4:
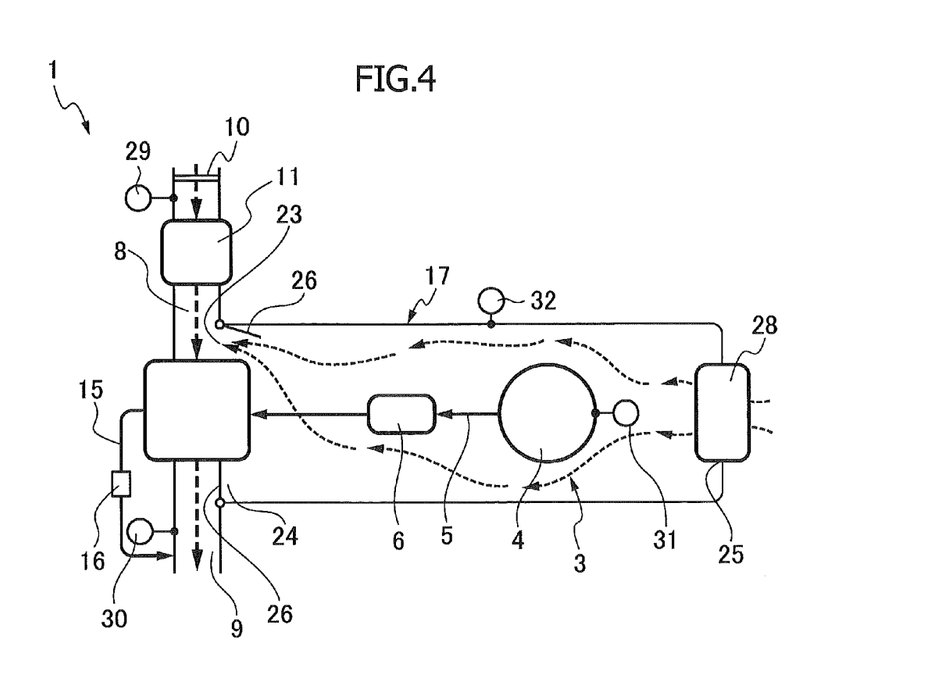
FIG. 4 is a block diagram showing an operation of the fuel cell system according to the embodiment of the present invention during a high-temperature period.

On the other hand, during a high-temperature period, as shown in FIG. 4, the fuel cell system 1 opens the first communication part 23 with the first switch valve 26 and, at the same time, closes the second communication part 24 with the second switch valve 27, and further rotates the air blowing fan 28 in the third communication part 25 in an air supplying direction, which is from the outside to the inside of the heat exchange chamber 17, to thereby guide the cooling air inside the heat exchange chamber 17 into the air supply duct 8 connected to the fuel cell stack 2 so that excessive heating of the fuel cell stack 2 can be prevented.

The excessive heating of the fuel cell stack 2 is possible when it generates power under a high-temperature, high-load condition. Under such a condition, the pressure of the hydrogen tank 4 drops rapidly, and accordingly the temperature of the hydrogen-related components including the hydrogen tank 4 drops greatly. Thus, by guiding the air inside the heat exchange chamber 17 into the fuel cell stack 2, it is possible to prevent the excessive heating of the fuel cell stack 2.

The first switch valve 26 and the second switch valve 27 both close their respective first communication part 23 and second communication part 24, and the air blowing fan 28 in the third communication part 25 is stopped, when the temperatures are within ranges within which there is no possibility of the excessive cooling of the hydrogen-related components or the excessive heating of the fuel cell stack 2.

Figure 5:
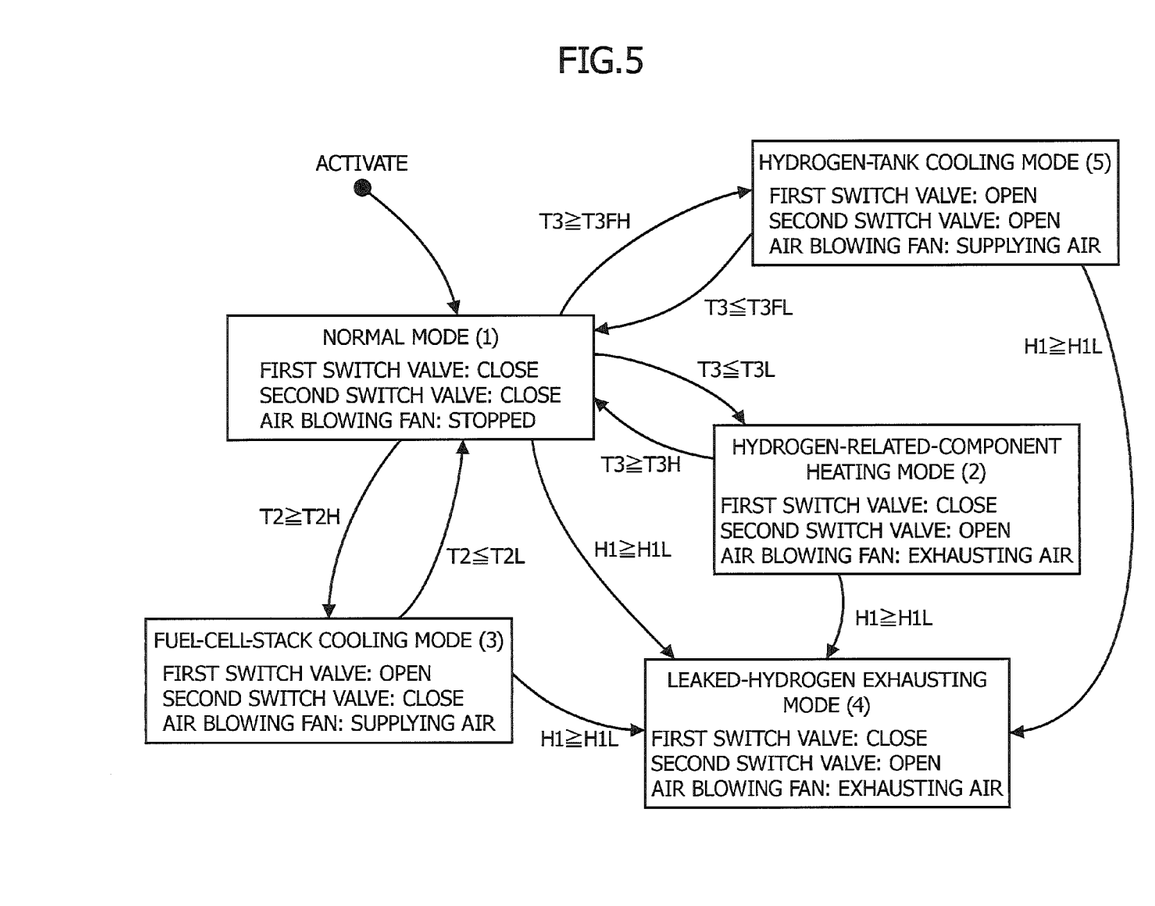
FIG. 5 is a state transition diagram of the fuel cell system according to the embodiment of the present invention.

Next, the control of the first switch valve 26, the second switch valve 27, and the air blowing fan 28 of the fuel cell system 1 will be described in detail for each condition in accordance with a state transition diagram in FIG. 5.

The fuel cell system 1 inputs signals T1, T2, T3, and H1 detected by the supplied-air temperature sensor 29, the exhausted-air temperature sensor 30, the hydrogen-tank temperature sensor 31, and the hydrogen-gas concentration sensor 32, respectively, into the control means 33 to make the control means 33 control the first switch valve 26, the second switch valve 27, and the air blowing fan 28 in the following ways.

First, as the fuel cell system 1 is activated, the control means 33 runs the fuel cell system 1 in a normal mode (1). In the normal mode (1), the first switch valve 26 and the second switch valve 27 both close the first communication part 23 and the second communication part 24, and the air blowing fan 28 in the third communication part 25 is set to a stopped state.

When the fuel cell vehicle equipped with the fuel cell system 1 experiences an increase in load, which increases the current generated in the fuel cell stack 2 and thus increases the amount of hydrogen consumed in the fuel cell stack 2, the pressure of the hydrogen tank 4 drops rapidly, thereby lowering the temperature of the hydrogen-related components such as the hydrogen tank 4 and the pressure-reducing valve 5. When the temperature T3 detected by the hydrogen-tank temperature sensor 31 reaches or falls below a predetermined temperature T3L (lower limit temperature) set in advance (T3≤T3L), the control means 33 runs the fuel cell system 1 in a hydrogen-related-component heating mode (2).

In the hydrogen-related-component heating mode (2), the control means 33 closes the first communication part 23 with the first switch valve 26 and, at the same time, opens the second communication part 24 with the second switch valve 27, and further rotates the air blowing fan 28 in the third communication part 25 in the air exhausting direction to thereby guide the hot exhaust air from the fuel cell stack 2 into the heat exchange chamber 17. The waste heat from the fuel cell stack 2 raises the temperature of the hydrogen tank 4 and the hydrogen-related components.

The fuel cell system 1 shifts back to the normal mode (1) when the temperature of the hydrogen tank 4 and the hydrogen-related components rises due to the waste heat from the fuel cell stack 2, and the temperature T3 detected by the hydrogen-tank temperature sensor 31 reaches or exceeds a predetermined temperature T3H (T3≥T3H) which is higher than the predetermined temperature T3L. Upon shifting to the normal mode (1), the control means 33 closes the second communication part 24 with the second switch valve 27 and stops the rotation of the air blowing fan 28 in the third communication part 25. Here, the control means 33 has hysteresis in the control of the first switch valve 26, the second switch valve 27, and the air blowing fan 28. For this reason, the first predetermined temperature T3H is set to a value greater than the second predetermined temperature T3L (T3H>T3L).

Next, during a high-temperature period, the control means 33 runs the fuel cell system 1 in a fuel-cell-stack cooling mode (3) when the temperature T2 detected by the exhausted-air temperature sensor 30 of the fuel cell stack 2 reaches or exceeds a predetermined temperature T2H (upper limit temperature) set in advance (T2≥T2H). In the fuel-cell-stack cooling mode (3), the control means 33 opens the first communication part 23 with the first switch valve 26 and, at the same time, closes the second communication part 24 with the second switch valve 27, and further rotates the air blowing fan 28 in the third communication part 25 in the air supplying direction to thereby guide the cooling air inside the heat exchange chamber 17 into the air supply duct 8 of the fuel cell stack 2. The cooling air inside the heat exchange chamber 17 lowers the temperature of the fuel cell stack 2.

The fuel cell system 1 shifts back to the normal mode (1) when the temperature of the fuel cell stack 2 drops by taking in the air inside the heat exchange chamber 17 which is cooler than the ambient air, and the temperature T2 detected by the exhausted-air temperature sensor 30 reaches or falls below a predetermined temperature T2L (T2≤T2L) which is lower than the predetermined temperature T2H. Upon shifting to the normal mode (1), the control means 33 closes the first communication part 23 with the first switch valve 26 and stops the rotation of the air blowing fan 28 in the third communication part 25. Here, the control means 33 has hysteresis in the control of the first switch valve 26, the second switch valve 27, and the air blowing fan 28. For this reason, the first predetermined temperature T2L is set to a value less than the second predetermined temperature T2H (T2L<T2H).

Moreover, this fuel cell system 1 performs the following two types of control, in addition to the control described above.

The first type of control is the control of the fuel cell system 1 in a hydrogen leaking state. A hydrogen-gas concentration H1 inside the heat exchange chamber 17 detected by the hydrogen-gas concentration sensor 32 rises in a case of a leakage of hydrogen gas from any of the hydrogen-related components such as the hydrogen tank 4 and those between the hydrogen tank 4 and the fuel cell stack 2 including the hydrogen supply pipe 5 and the pressure-reducing valve 6. The control means 33 runs the fuel cell system 1 in a leaked-hydrogen exhausting mode (4) when the detected hydrogen-gas concentration H1 reaches or exceeds a predetermined concentration H1L (H1≥H1L) set in advance.

In the leaked-hydrogen exhausting mode (4), the control means 33 closes the first communication part 23 with the first switch valve 26 and, at the same time, opens the second communication part 24 with the second switch valve 27, and further rotates the air blowing fan 28 in the third communication part 25 in the air exhausting direction to thereby exhaust the leaked hydrogen gas inside the heat exchange chamber 17 to the atmosphere. In this way, it is possible to prevent the hydrogen gas from remaining inside the heat exchange chamber 17. The fuel cell system 1 shifts to the leaked-hydrogen exhausting mode (4) as soon as the hydrogen-gas concentration H1 detected by the hydrogen-gas concentration sensor 32 reaches or exceeds the predetermined concentration H1L, regardless of whether the fuel cell system 1 is run in any of the above-described modes (1), (2), and (3) or in a later-described mode (5).

The second type of control is the control performed at the time of filling hydrogen gas into the hydrogen tank 4. In a hydrogen station for filling hydrogen gas, the hydrogen gas is filled into the hydrogen tank 4 of the fuel cell vehicle from the hydrogen station side. In this process, the tank temperature rises due to the hydrogen gas which is adiabatically compressed. The hydrogen tank 4 has an allowable temperature not only on the lower temperature side but also on the higher temperature side and cannot be used within a range of temperature above this.

In this respect, a pre-cooling technique has been known in which hydrogen gas lowered to a low temperature in advance is filled. Some other method has also been known in which the fuel cell vehicle side and the hydrogen station side communicate with each other so that the hydrogen station side can figure out the tank temperature of the hydrogen tank 4 mounted on the vehicle and control the filling rate in such a way as to prevent the temperature from reaching the allowable temperature. In the present case, too, suppressing the temperature increase in the hydrogen tank 4 is effective in view of hastening the filling rate.

In this fuel cell system 1, during the filling of hydrogen gas into the hydrogen tank 4, the control means 33 runs the fuel cell system 1 in a hydrogen-tank cooling mode (5) when the tank temperature T3 detected by the hydrogen-tank temperature sensor 31 reaches or exceeds a predetermined value T3FH (T3≧T3FH) set in advance. In the hydrogen-tank cooling mode (5), the control means 33 opens the first communication part 23 and the second communication part 24 with the first switch valve 26 and the second switch valve 27, and further rotates the air blowing fan 28 in the third communication part 25 in the air supplying direction to scavenge the inside of the heat exchange chamber 17. As a result, the hydrogen tank 4 is cooled down.

The fuel cell system 1 shifts back to the normal mode (1) when the temperature of the hydrogen tank 4 drops and the tank temperature T3 detected by the hydrogen-tank temperature sensor 31 reaches or falls below another predetermined value T3FL (T3≦T3FL) which is lower than the predetermined value T3FH. Upon shifting to the normal mode (1), the control means 33 closes the first communication part 23 and the second communication part 24 with the first switch valve 26 and the second switch valve 27 and stops the rotation of the air blowing fan 28 in the third communication part 25. Here, the control means 33 has hysteresis in the control of the first switch valve 26, the second switch valve 27, and the air blowing fan 28. For this reason, the second predetermined value T3FL is set to a value less than the first predetermined value T3FH (T3FH>T3FL).

As described above, by the structure in which the hydrogen-gas supply device 3 is disposed inside the heat exchange chamber 17 capable of communicating with the air supply duct 8 and the air exhaust duct 9, the fuel cell system 1 heats the hydrogen-gas supply device 3 with the hot air exhausted from the fuel cell stack 2 when the tank temperature T3 of the hydrogen tank 4 reaches or falls below the predetermined temperature T3L. Accordingly, it is possible to prevent the hydrogen-gas supply device 3 from becoming cold.

Moreover, the fuel cell system 1 can supply the fuel cell stack 2 with the air introduced into the heat exchange chamber 17 and cooled down by the hydrogen-gas supply device 3 when the temperature T2 of the air exhausted from the fuel cell stack 2 reaches or exceeds the predetermined temperature T2H. Accordingly, it is possible to improve the cooling performance of the fuel cell stack 2.

In the case in which the fuel cell stack 2 is an air-cooled fuel cell stack using air as both the reactant gas and the cooling medium, the fuel cell system 1 can further improve the cooling performance of the fuel cell stack 2 by employing the above structure.

Moreover, the fuel cell system 1 can switch the direction of the communication of the heat exchange chamber 17 and the direction of the air flow by the structure in which the first switch valve 26 is disposed in the first communication part 23 communicating with the air supply duct 8, the second switch valve 27 is disposed in the second communication part 24 communicating with the air exhaust duct 9, and the air blowing fan 28, which is capable of switching its air blowing direction, is disposed in the third communication part 25 at an upstream position in the direction of the flow of the hydrogen gas. Accordingly, it is possible to switch between the state for preventing the hydrogen-gas supply device 3 from being cold and the state for improving the cooling performance of the fuel cell stack 2.

The fuel cell system can switch the state to the more optimal of the state for preventing the hydrogen-gas supply device 3 from being cold and the state for improving the cooling performance of the fuel cell stack 2 on the basis of the temperature of the air flowing in the air supply duct 8 which is detected by the supplied-air temperature sensor 29, the temperature of the air flowing in the air exhaust duct 9 which is detected by the exhausted-air temperature sensor 30, and the tank temperature of the hydrogen tank 4 which is detected by the hydrogen-tank temperature sensor 31.

Further, in the fuel cell system, the hydrogen purge pipe 15 for exhausting surplus hydrogen gas connected to the fuel cell stack 2 has its downstream end portion connected to the air exhaust duct 9 at a portion downstream of the second communication part 24 in the direction of the flow of the air in the air exhaust duct 9. Accordingly, it is possible to prevent the surplus hydrogen gas, which is exhausted through the hydrogen purge pipe 15, from flowing into the heat exchange chamber 17.

The fuel cell system 1 introduces ambient air into the heat exchange chamber 17 and flows it into the air exhaust duct 9 when the hydrogen-gas concentration inside the heat exchange chamber 17 which is detected by the hydrogen-gas concentration sensor 32 reaches or exceeds a predetermined concentration. Accordingly, it is possible to prevent the hydrogen gas from remaining inside the heat exchange chamber 17 and thereby improve the safety of the fuel cell system 1.

Since the air blowing fan 28 has an explosion-proof structure, the fuel cell system 1 can safely drive the air blowing fan 28 even when the hydrogen gas leaks into the heat exchange chamber 17.

Furthermore, in the case of filling hydrogen gas into the hydrogen tank 4, the fuel cell system 1 opens at least one of the first switch valve 26 and the second switch valve 27 (both valves in this embodiment) and introduces ambient air into the heat exchange chamber 17 by means of the air blowing fan 28 when the temperature of the hydrogen tank 4 reaches or exceeds a predetermined value. Thus, when the hydrogen gas is filled into the hydrogen tank 4, the ambient air cools down the hydrogen tank 4, thereby making it possible to suppress a temperature increase therein due to the adiabatic compression of the hydrogen gas. Accordingly, it is possible to shorten the time required to fill the hydrogen gas into the hydrogen tank 4.

In the fuel cell system 1, the heat exchange chamber 17 has the structure in which the lower chamber part 18 is in such a cross-sectional shape as to be open on the upper side, and the upper chamber part 20 formed in the floor 21 of the vehicle closes the opening 19 on the upper side of the lower chamber part 18. Thus, the structure of the heat exchange chamber 17 is made simple. Accordingly, it is possible to improve the mountability thereof on the vehicle.

While the heat exchange chamber 17 is provided in the air-cooled fuel cell system 1 in the foregoing embodiment, the method of cooling the fuel cell system is not limited to air-cooled fuel cell systems and is applicable to water-cooled fuel cell systems. Specifically, since the temperature of the exhaust air is higher in water-cooled fuel cell systems than in air-cooled fuel cell systems, the effect of preventing the excessive cooling of the hydrogen-related components in a low-temperature period is greater.

Moreover, while the forced blower fan 11 is provided in the air supply duct 8 for supplying air into the fuel cell stack 2 in the foregoing embodiment, it is possible to provide an induced blower fan in the air exhaust duct 9 on the outlet side of the fuel cell stack 2.

Furthermore, while one air blowing fan 28 capable of rotating forward and backward is provided for blowing air into and out of the heat exchange chamber 17 in the foregoing embodiment, it is possible to provide both a fan for blowing air in and a fan for blowing air out.

INDUSTRIAL APPLICABILITY

This invention prevents hydrogen-related components from becoming cold due to the adiabatic expansion of hydrogen gas and also to improves the cooling performance of a fuel cell stack, and is applicable not only to air-cooled fuel cell systems but also to water-cooled fuel cell systems.

The invention claimed is:

1. A fuel cell system comprising: a fuel cell stack; a hydrogen-gas supply device configured to supply hydrogen gas filled in a hydrogen tank into the fuel cell stack along with pressure reduction of the hydrogen gas; an air supply duct configured to supply air into the fuel cell stack; and an air exhaust duct configured to exhaust surplus air from the fuel cell stack, the fuel cell system, wherein
the hydrogen-gas supply device is disposed inside a heat exchange chamber capable of communicating with the air supply duct and the air exhaust duct,
the air exhausted from the fuel cell stack is introduced into the heat exchange chamber when a temperature of the hydrogen-gas supply device reaches or falls below a predetermined temperature, and
air introduced into the heat exchange chamber and cooled down by the hydrogen-gas supply device is supplied into the fuel cell stack when a temperature of the air exhausted from the fuel cell stack reaches or exceeds a predetermined temperature.

2. The fuel cell system according to claim 1, wherein the fuel cell stack is an air-cooled fuel cell stack using air as both a reactant gas and a cooling medium.

3. The fuel cell system according to claim 1, wherein
the heat exchange chamber includes: a first switch valve for opening and closing a first communication part communicating with the air supply duct; a second switch valve for opening and closing a second communication part communicating with the air exhaust duct; and a third communication part communicating with an outside at an upstream portion of the heat exchange chamber in a direction of a flow of the hydrogen gas, and
an air blowing fan capable of switching an air blowing direction thereof is arranged in the third communication part.

4. The fuel cell system according to claim 3, wherein
a temperature sensor configured to detect a temperature of air is arranged in each of the air supply duct and the air exhaust duct,
a temperature sensor configured to detect a temperature of the hydrogen tank is arranged in the hydrogen-gas supply device, and
the first switch valve, the second switch valve, and the air blowing fan are operated selectively based on the temperatures detected by the temperature sensors.

5. The fuel cell system according to claim 4, wherein in a case of filling hydrogen gas into the hydrogen tank, at least one of the first switch valve and the second switch valve is opened and the ambient air is introduced into the heat exchange chamber by means of the air blowing fan when the temperature of the hydrogen tank reaches or exceeds a predetermined value.

6. The fuel cell system according to claim 3, wherein
a hydrogen purge pipe for exhausting surplus hydrogen gas is connected to the fuel cell stack, and
a downstream end portion of the hydrogen purge pipe is connected to the air exhaust duct at a portion downstream of the second communication part in a direction of a flow of the air in the air exhaust duct.

7. The fuel cell system according to claim 3, wherein the air blowing fan has an explosion-proof structure.

8. The fuel cell system according to claim 1, wherein
the heat exchange chamber includes a hydrogen-gas concentration sensor configured to detect a hydrogen-gas concentration therein, and
ambient air is introduced into the heat exchange chamber and flowed into the air exhaust duct when the hydrogen-gas concentration detected by the hydrogen-gas concentration sensor reaches or exceeds a predetermined concentration.

9. The fuel cell system according to claim 1, wherein
the heat exchange chamber includes a lower chamber part in such a cross-sectional shape as to be open on an upper side, and an upper chamber part for closing the opening in the lower chamber part, and
the upper chamber part is formed by a floor of a vehicle.

* * * * *